(12) United States Patent  
DiVerdi

(10) Patent No.: US 9,011,072 B2  
(45) Date of Patent: *Apr. 21, 2015

(54) APPARATUS FOR ACCESSING AND STORING OBJECTS

(71) Applicant: Marc Anthony DiVerdi, Shrewsbury, MA (US)

(72) Inventor: Marc Anthony DiVerdi, Shrewsbury, MA (US)

(73) Assignee: Marc A. DiVerdi

( * ) Notice: Subject to any disclaimer, the term of this patent is extended or adjusted under 35 U.S.C. 154(b) by 58 days.

This patent is subject to a terminal disclaimer.

(21) Appl. No.: 13/815,378

(22) Filed: Feb. 26, 2013

(65) Prior Publication Data

US 2013/0315693 A1 Nov. 28, 2013

Related U.S. Application Data

(63) Continuation-in-part of application No. 12/583,195, filed on Aug. 14, 2009, now Pat. No. 8,382,418, which is a continuation-in-part of application No. 12/383,106, filed on Mar. 19, 2009, now abandoned.

(60) Provisional application No. 61/070,090, filed on Mar. 20, 2008.

(51) Int. Cl.
  *B60P 3/10* (2006.01)
  *B60R 9/042* (2006.01)
  *B60P 3/40* (2006.01)
  *E06C 5/02* (2006.01)

(52) U.S. Cl.
  CPC . *B60R 9/042* (2013.01); *E06C 5/02* (2013.01); *Y02B 50/144* (2013.01); *B60R 9/0423* (2013.01); *B60P 3/40* (2013.01)

(58) Field of Classification Search
  USPC .......... 187/245, 270; 224/309, 310, 324, 405; 414/462, 598, 607, 639, 785
  See application file for complete search history.

(56) References Cited

U.S. PATENT DOCUMENTS

| | | |
|---|---|---|
| 904,717 A | 11/1908 | Palmer |
| 2,946,397 A | 7/1960 | Berberich |
| 3,521,774 A | 7/1970 | Raypholtz |
| 3,782,565 A | 1/1974 | Doran et al. |
| 4,353,308 A | 10/1982 | Brown |
| 4,439,086 A | 3/1984 | Thede |
| 4,826,387 A | 5/1989 | Audet |
| 4,954,030 A | 9/1990 | Szucs et al. |
| 5,009,350 A | 4/1991 | Schill |
| 5,104,280 A | 4/1992 | Ziaylek et al. |
| 5,154,563 A | 10/1992 | Phillips |
| 5,165,504 A | 11/1992 | Lecorre |
| 5,403,142 A | 4/1995 | Stewart |
| 5,518,357 A | 5/1996 | Ziaylek et al. |
| 5,584,521 A * | 12/1996 | Hathaway et al. ............... 296/36 |
| 5,651,484 A | 7/1997 | Fugman |
| 5,813,814 A | 9/1998 | Smart |
| 5,846,045 A | 12/1998 | Johnson et al. |

(Continued)

OTHER PUBLICATIONS

Hendeickson, A., Mechanical Design for the Stage, 2008, p. 374, Elsevier, Inc., Oxford, UK.

*Primary Examiner* — Gregory Adams
(74) *Attorney, Agent, or Firm* — Michael J. DiVerdi

(57) ABSTRACT

The present invention relates to an apparatus for transferring an object from a lower accessible position to a higher storage position, which is particularly useful on vehicles. The present invention also relates to a method of transferring an object from a lower accessible position to a higher storage position.

16 Claims, 14 Drawing Sheets

(56) References Cited

U.S. PATENT DOCUMENTS

| | | |
|---|---|---|
| 5,988,470 A | 11/1999 | Siciliano |
| 6,098,550 A | 8/2000 | Tsuboi |
| 6,315,181 B1 | 11/2001 | Bradley |
| 6,322,304 B1 | 11/2001 | Chasen |
| 6,349,793 B1 | 2/2002 | Kincaid |
| 6,360,930 B1 | 3/2002 | Flickinger |
| 6,604,606 B1 | 8/2003 | McDougal |
| 6,606,844 B2 | 8/2003 | Dillon |
| 6,612,101 B2 | 9/2003 | Dillon |
| 6,634,529 B2 | 10/2003 | Choiniere |
| 6,688,428 B2 | 2/2004 | Carroll, Jr. |
| 6,748,845 B2 | 6/2004 | Staiert et al. |
| 6,827,541 B1 | 12/2004 | Ziaylek et al. |
| 7,025,546 B2 | 4/2006 | Clive-Smith |
| 7,048,490 B2 | 5/2006 | Henderson |
| 7,121,613 B1 | 10/2006 | Rasmussen |
| 7,137,479 B2 | 11/2006 | Ziaylek et al. |
| 7,186,065 B2 | 3/2007 | Clive-Smith |
| 7,198,320 B2 | 4/2007 | Rasmussen |
| 7,200,968 B2 | 4/2007 | Jaworski |
| 7,311,176 B2 | 12/2007 | Stevens |
| 7,380,769 B1 | 6/2008 | Dorris |
| 7,384,093 B2 | 6/2008 | Rasmussen |
| 7,437,843 B2 | 10/2008 | Lefebure |
| 7,448,586 B2 | 11/2008 | Ziaylek et al. |
| 7,469,958 B2 | 12/2008 | Hastings |
| 7,802,708 B2 | 9/2010 | Adamczewski et al. |
| 8,382,418 B2 * | 2/2013 | DiVerdi ................ 414/462 |
| 2004/0131456 A1 | 7/2004 | Henderson et al. |
| 2005/0082326 A1 | 4/2005 | Badillo |
| 2007/0090139 A1 | 4/2007 | McKenzie |
| 2010/0054902 A1 * | 3/2010 | DiVerdi ................ 414/785 |

* cited by examiner 4A
4B

APPARATUS FOR ACCESSING AND STORING OBJECTS

CROSS REFERENCE TO RELATED APPLICATIONS

This application is a continuation-in-part of and claims the benefit of priority under 35 U.S.C. §120 to U.S. patent application Ser. No. 12/583,195, filed Aug. 14, 2009, which is a continuation-in-part of and claims the benefit of priority under 35 U.S.C. §120 to U.S. patent application Ser. No. 12/383,106, filed Mar. 19, 2009, now abandoned, which claims the benefit of priority under 35 U.S.C. §119 to U.S. provisional patent application Ser. No. 61/070,090, filed Mar. 20, 2008, the entire contents of all applications are incorporated herein by reference.

BACKGROUND OF THE INVENTION

Numerous utility apparatuses exist for storing objects on a vehicle. Vehicle racks for vans and pick up trucks, for example, have been designed to transport a wide variety of objects including tools and implements such as ladders, pipes, tool boxes, building materials, rakes, shovels, brooms and sporting equipment such as skis, surfboards, bicycles, kayaks, and other items. For the craftsman or sports enthusiast, movement of these objects on and off the vehicle is difficult and in cases of heavier objects can be dangerous, especially under in climate weather conditions such as snow and ice. In order to facilitate moving and storing these objects, storage racks have been designed that involve moving parts. In general, they involve loading an object in a lower position along side the vehicle and then manually transferring the object to a higher storage position on top of the vehicle.

Movement of larger, elongated objects such as ladders or heavy objects such as tool boxes between these lower and higher positions still requires a significant amount of effort on the part of the user. In both directions, the user must fight against gravity to lift the object to the higher position or prevent it from slamming to the ground when lowering it. Lowering an elongated or heavy object, or both, can be especially dangerous if done too rapidly, potentially causing injury to the user or damage to the vehicle.

U.S. Pat. No. 7,384,093 discloses a vehicle comprising an apparatus for moving an object between a use position and a stowed position, but the apparatus is constructed within the vehicle and is not practical for large objects such as a ladder.

Published U.S. Patent Application No. 20080110949 discloses a fixed apparatus that clamps to the side of a panel truck that can carry large, flat objects such as sheets of wood. The apparatus, however, is limited in the variety of material it can carry by the space along side of the panel truck, and lacks the ability to move an object from a lower accessible position to an upper storage position.

Published U.S. Patent Application No. 20020179661 discloses a rooftop rack for carrying bicycles comprising a base, which is mounted on the vehicle roof, a pivotable arm for moving a tray carrying the bicycle, and a winch and cable system for moving the tray from a lower accessible position to the top of the vehicle. Although convenient for bicycles, such a winch and cable system is not ideal for heavier objects such as equipment and tools used by the average craftsman.

U.S. Pat. No. 7,137,479 discloses a powered ladder storage apparatus for transferring a ladder between an upper storage position on an emergency vehicle and a lower, rearward accessible position that is at about a 45 degree angle to the vehicle. The apparatus comprises a pivotally movable carriage and a power drive for moving the ladder between the two positions. The apparatus, however, lacks general utility for objects other than a ladder. The power drive also requires many moving parts and cables making it impractical for vehicles other than emergency vehicles.

U.S. Pat. No. 6,827,541 discloses an apparatus for transferring a ladder between an upper storage position on an emergency vehicle and a lower accessible position alongside the vehicle comprising two hydraulic cylinders that power a lift arm. However, the range of motion requires two hydraulic cylinder which need to coordinate the lifting action of the lift arm. As the two cylinders wear down from general use such coordination will become more difficult. The complexity of the system also makes it impractical for non-emergency vehicles.

U.S. Pat. No. 6,360,930 discloses a utility rack for a motor vehicle comprising a stationary mounting frame, a cargo frame movable between an accessible position alongside the vehicle and a storage position on top of the vehicle, and means of manually moving the cargo frame between the two positions. The utility rack can be used on non-emergency vehicles and also comprises a hydraulic assist for the manual movement. However, the cargo frame requires a network of supports pivotally attached to each other to move the cargo between the two positions which may be difficult to operate, even with the hydraulic assist, under in climate weather conditions.

U.S. Pat. No. 6,315,181 also discloses a utility rack for a motor vehicle for manually transferring a ladder from an accessible position alongside the vehicle to an upper storage position on top of the vehicle. Transfer is accomplished by manually pivoting a lifting arm that traverses the 270 degrees between the two positions. Although the utility rack can be used on non-emergency vehicles, the wide range of motion necessary for the operator to achieve is difficult with heavier objects or with multiple ladders.

There still exists a need for an apparatus for transferring objects between lower accessible and upper storage positions on emergency and non-emergency vehicles alike that requires little effort and has a minimum of moving parts.

SUMMARY OF THE INVENTION

In one aspect, the present invention relates to an apparatus for transferring an object between an upper storage position and a lower accessible position comprising: a stationary mounting frame comprising two tracks each having a rail capable of effectively interlocking a gear or sprocket; and at least one carriage positioned between the tracks comprising a) a tray having two distal ends, b) a gear or sprocket at each distal end effectively interlocking with the rail, c) an object fastener attached to the tray, and d) a power drive operatively attached to the tray and capable of rotating one or both of the gears or sprockets. In a further embodiment, the mounting frame is mounted to a vehicle.

In a further embodiment, the rail comprises an array of teeth, a chain, or a series of holes in the track.

In a further embodiment, the object is an elongated object. In a further embodiment, the object is a ladder, scaffolding, staging, pipes, lumber, aluminum posts, or pump jack. In a further embodiment, the object is a ladder.

In a further embodiment, the mounting frame traverses the top and one side of the vehicle. In a further embodiment, the mounting frame traverses the top and two sides of the vehicle.

In a further embodiment, the apparatus further comprises 1, 2, or 3 additional carriages each comprising a tray having two distal ends, a gear or sprocket at each distal end effectively interlocking with the rail, and an object fastener attached to the tray. In a further embodiment, the carriages are connected to each other by a chain.

In a further embodiment, the power drive is a motor. In a further embodiment, the motor is capable of rotating both gears or sprockets through an axle. In a further embodiment, the apparatus further comprises a second motor operatively attached to the tray, wherein each motor is attached to one gear or sprocket through an axle. In a further embodiment, the apparatus further comprises a receiver operatively attached to the motor, and capable of receiving signal and transferring it to the motor(s). In a further embodiment, the signal is an on or off signal for the motor(s).

In a further embodiment, the object fastener comprise a clamp, Velcro strap, bungee chord, buckle, or chord. In a further embodiment, the object fastener comprises at least two posts and clamping device which operatively and reversibly clamps onto one or more posts after the object has been placed on the posts. In a further embodiment, the object fastener comprises four posts and a clamping device which operatively and reversibly clamps onto one or more posts after the object has been placed on the posts.

In a further embodiment, the object fastener comprises tubing mounted to the tray and having removable caps at either end on the tubing. In a further embodiment, the tubing is polyvinyl chloride tubing.

In a further embodiment, the rail is an array of teeth and the carriage comprises a gear at each distal end of the tray. In another embodiment, the rail is a chain and the carriage comprises a sprocket at each distal end of the tray. In another embodiment, the rail is a series of holes in each track and the carriage comprises a sprocket at each distal end of the tray.

In another aspect, the present invention relates to an apparatus for transferring an object between an upper storage position and a lower accessible position comprising: a stationary mounting frame comprising two tracks each housing a chain capable of effectively interlocking with a sprocket; and at least one carriage positioned between the tracks comprising: a) a tray having two distal ends, b) a sprocket at each distal end effectively interlocking with the chain housed in the tracks, c) an object fastener attached to the tray, and d) a power drive operatively attached to the tray capable of rotating one or both of the sprockets at each distal end. In a further embodiment, the mounting frame is attached to a vehicle. In another embodiment, the mounting frame traverses the top and one side of the vehicle. In a further embodiment, the mounting frame traverses the top and two sides of the vehicle.

In another embodiment, the apparatus further comprises 1, 2, or 3 additional carriages each comprising a tray having two distal ends, a sprocket at each distal end effectively interlocking with the chain housed in the tracks, and an object fastener attached to the tray. In another embodiment, the carriages are connected to each other by a chain.

In a further embodiment, the power drive is a motor. In a further embodiment, the motor is capable of rotating both gears through an axle. In a further embodiment, the apparatus further comprises a second motor operatively attached to the tray, wherein each motor is attached to one gear through an axle. In a further embodiment, the apparatus further comprises a receiver operatively attached to the motor, and capable of receiving signal and transferring it to the motor(s). In a further embodiment, the signal is an on or off signal for the motor(s).

In another embodiment, the object fastener comprises a clamp, Velcro strap, bungee chord, buckle, or chord. In another embodiment, the object fastener comprises at least two posts and a clamping device which operatively and reversibly clamps onto one or more posts after the object has been placed on the posts. In a further embodiment, the object fastener comprises four posts and a clamping device which operatively and reversibly clamps onto one or more posts after the object has been placed on the posts. In another embodiment, the object fastener comprises tubing mounted to the tray and having removable caps at either end on the tubing. In a further embodiment, the tubing is polyvinyl chloride tubing.

In another aspect, the present invention relates to an apparatus for transferring an object between an upper storage position and a lower accessible position comprising: a stationary mounting frame comprising two tracks each comprising a series of holes capable of effectively interlocking with a sprocket; and at least one carriage positioned between the tracks comprising: a) a tray having two distal ends, b) a sprocket at each distal end effectively interlocking with the series of holes housed in the tracks, c) an object fastener attached to the tray, and d) a power drive operatively attached to the tray capable of rotating one or both of the sprockets at each distal end. In a further embodiment, the mounting frame is attached to a vehicle. In another embodiment, the mounting frame traverses the top and one side of the vehicle. In a further embodiment, the mounting frame traverses the top and two sides of the vehicle.

In another embodiment, the apparatus further comprises 1, 2, or 3 additional carriages each comprising a tray having two distal ends, a sprocket at each distal end effectively interlocking with the series of holes in the tracks, and an object fastener attached to the tray. In another embodiment, the carriages are connected to each other by a chain.

In a further embodiment, the power drive is a motor. In a further embodiment, the motor is capable of rotating both gears through an axle. In a further embodiment, the apparatus further comprises a second motor operatively attached to the tray, wherein each motor is attached to one gear through an axle. In a further embodiment, the apparatus further comprises a receiver operatively attached to the motor, and capable of receiving signal and transferring it to the motor(s). In a further embodiment, the signal is an on or off signal for the motor(s).

In another embodiment, the object fastener comprises a clamp, Velcro strap, bungee chord, buckle, or chord. In another embodiment, the object fastener comprises at least two posts and a clamping device which operatively and reversibly clamps onto one or more posts after the object has been placed on the posts. In a further embodiment, the object fastener comprises four posts and a clamping device which operatively and reversibly clamps onto one or more posts after the object has been placed on the posts. In another embodiment, the object fastener comprises tubing mounted to the tray and having removable caps at either end on the tubing. In a further embodiment, the tubing is polyvinyl chloride tubing.

In another aspect, the present invention relates to an apparatus for transferring an object between an upper storage position and a lower accessible position comprising: a stationary mounting frame comprising two tracks each having a rail capable of effectively interlocking with at least one gear; and at least one carriage positioned between the tracks comprising: a) a tray having two distal ends, b) a gear at each distal end effectively interlocking with two additional gears that interlock with the rail, c) an object fastener attached to the tray, and d) a power drive operatively attached to the tray capable of rotating one or both of the gears at each distal end. In a further embodiment, the mounting frame is attached to a vehicle. In a further embodiment, the mounting frame traverses the top and one side of the vehicle. In a further embodiment, the mounting frame traverses the top and two sides of the vehicle. In a further embodiment, the rail is an array of teeth capable of effectively interlocking with the two additional gears.

In a further embodiment, the object fastener fastens an elongated object. In a further embodiment, the object fastener fastens a ladder, scaffolding, staging, pipes, lumber, aluminum posts, or pump jack. In a further embodiment, the object fastener fastens a ladder.

In a further embodiment, the apparatus comprises 1, 2, or 3 additional carriages each comprising a tray having two distal ends, a gear at each distal end effectively interlocking with two additional gears that interlock with the rail, and an object fastener attached to the tray. In a further embodiment, the carriages are connected to each other by a chain.

In a further embodiment, the power drive is a motor. In a further embodiment, the motor is capable of rotating both gears through an axle. In a further embodiment, the apparatus further comprises a second motor operatively attached to the tray, wherein each motor is attached to one gear through an axle. In a further embodiment, the apparatus further comprises a receiver operatively attached to the motor, and capable of receiving signal and transferring it to the motor(s). In a further embodiment, the signal is an on or off signal for the motor(s).

In a further embodiment, the object fastener comprises a clamp, Velcro strap, bungee chord, buckle, or chord. In a further embodiment, the object fastener comprises at least two posts and a clamping device which operatively and reversibly clamps onto one or more posts after the object has been placed on the posts. In a further embodiment, the object fastener comprises four posts and clamping device which operatively and reversibly clamps onto one or more posts after the object has been placed on the posts. In a further embodiment, the object fastener comprises tubing mounted to the tray and having removable caps at either end on the tubing. In a further embodiment, the tubing is polyvinyl chloride tubing.

In another aspect, the present invention relates to a method of loading an object onto a vehicle comprising: 1) fastening the object to a carriage in a lower accessible position wherein the carriage comprises: a) a tray having two distal ends, b) a gear or sprocket at each distal end effectively interacting with one or two tracks mounted to the vehicle each having a rail, c) an object fastener capable of securing the object to the tray, and d) a power drive operatively attached to the tray and capable of rotating one or both of the gears or sprockets; 2) initiating the power drive and rotating the gears or sprockets in a direction that moves the carriage in an upward direction; and 3) stopping the power drive when the carriage has reached an upper storage position.

In a further embodiment, the power drive is a motor. In a further embodiment, the motor is stopped automatically when the carriage has reached the upper storage position. In a further embodiment, the motor is stopped manually when the carriage has reached the upper storage position.

In a further embodiment, the rail comprises an array of teeth, a chain, or a series of holes in each track. In another embodiment, the rail is an array of teeth and the carriage comprises a gear at each distal end of the tray. In another embodiment, the rail is a chain and the carriage comprises a sprocket at each distal end of the tray. In another embodiment, the rail is a series of holes in each track and the carriage comprises a sprocket at each distal end of the tray.

In a further embodiment, the object is an elongated object. In a further embodiment, the object is a ladder, scaffolding, staging, pipes, lumber, aluminum posts, or pump jack. In a further embodiment, the object is a ladder.

In a further embodiment, fastening the object to the tray comprises securing the object via a clamp, Velcro strap, bungee chord, buckle, or chord. In a further embodiment, fastening the object to the tray comprises placing the object on a at least two posts and securing the object on the posts with a clamp which operatively and reversibly clamps on to one or more posts. In a further embodiment, fastening the object to the tray comprises placing the object on four posts and securing the object on the posts with a clamp which operatively and reversibly clamps on to one or more posts. In a further embodiment, fastening the object to the tray comprises inserting the object into tubing mounted to the tray and having removable caps at either end on the tubing. In a further embodiment, the tubing is polyvinyl chloride tubing.

In another aspect, the present invention relates to a method of loading an object onto a vehicle comprising: 1) fastening the object to a carriage in a lower accessible position wherein the carriage comprises: a) a tray having two distal ends, b) a gear at each distal end effectively interacting with an additional two gears that effectively interact with a rail within a track mounted to the vehicle, c) an object fastener capable of securing the object to the tray, and d) a power drive operatively attached to the tray and capable of rotating one or both of the gears; 2) initiating the power drive and rotating the gears in a direction that moves the carriage in an upward direction; and 3) stopping the power drive when the carriage has reached an upper storage position. In a further embodiment, the rail is an array of teeth capable of effectively interlocking with the two gears.

In a further embodiment, the power drive is a motor. In a further embodiment, the motor is stopped automatically when the carriage reaches the upper storage position. In a further embodiment, the motor is stopped manually when the carriage reaches the upper storage position.

In a further embodiment, the object is an elongated object. In a further embodiment, the object is a ladder, scaffolding, staging, pipes, lumber, aluminum posts, or pump jack. In a further embodiment, the object is a ladder.

In a further embodiment, fastening the object to the tray comprises securing the object via a clamp, Velcro strap, bungee chord, buckle, or chord. In a further embodiment, fastening the object to the tray comprises placing the object on at least two posts and securing the object on the posts with a clamp which operatively and reversibly clamps on to one or more posts. In a further embodiment, fastening the object to the tray comprises placing the object on four posts and securing the object on the posts with a clamp which operatively and reversibly clamps on to one or more posts. In a further embodiment, fastening the object to the tray comprises inserting the object into tubing mounted to the tray and having removable caps at either end on the tubing. In a further embodiment, the tubing is polyvinyl chloride tubing.

In another aspect, the present invention features a utility stowage apparatus for transferring one or more objects between an upper storage position and a lower accessible position of a vehicle comprising: 1) a stationary mounting frame comprising two L-shaped or U-shaped tracks, wherein the tracks comprise respectively first and second portions, each of the first portions and second portions lying in parallel, wherein the first portions of the tracks are mounted to the top surface of the vehicle and the second portions of the tracks are detachable, 2) each of the first and second portions of the at least two tracks comprises at least a channel and at least a rail, 3) at least one carriage movably mounted on the rails and comprising: a) a tray having two distal ends, b) an axel connected to the tray and having first and second distal ends located proximate the distal ends of the tray, c) means for driving the carriage along the tracks, wherein the means further comprises at least a first means mounted on the first distal end of the axel and at least a second means mounted on the second distal end of the axel, wherein the first and second means respectively comprise a gear or a sprocket for effectively interlocking with the rails of the track wherein the means for driving are engagingly interlocked with the rail, d) at least a first bushing mounted on the first distal end of the axel and at least another bushing mounted on the second distal end of the axel, wherein the bushings guidingly engage the channels of the track, e) a power drive operatively connected to the axel and for rotating at least one of the first or second means, and f) an object fastener attached to the tray for supporting and retaining an object on the tray, wherein operation of the power drive rotates at least one of the first or second means for driving the carriage along the tracks between the lower accessible position and the upper storage position.

In one embodiment, the rail comprises an array of teeth, a chain, or a series of holes in the track. In one embodiment, the object fastener fastens skis, a surfboard, a bicycle, or a kayak.

In another embodiment, the apparatus further comprises 1, 2, or 3 additional carriages each comprising a tray having two distal ends, a gear or sprocket at each distal end effectively interlocking with the rail, and an object fastener attached to the tray. In another embodiment, the carriages are connected to each other by a chain. In another embodiment, the power drive is a motor. In another embodiment, the object fastener comprises a clamp, Velcro strap, bungee chord, buckle, or chord.

In another embodiment, the object fastener comprises at least two posts and a clamping device which operatively and reversibly clamps onto one or more posts after the object has been placed on the posts. In another embodiment, the object fastener comprises four posts and a clamping device which operatively and reversibly clamps onto one or more posts after the object has been placed on the posts In another embodiment, the object fastener comprises tubing mounted to the tray and having removable caps at either end on the tubing. In another embodiment, the tubing is polyvinyl chloride tubing.

In another embodiment, the rail is an array of teeth and the carriage comprises a gear at each distal end of the tray. In another embodiment, the rail is a chain and the carriage comprises a sprocket at each distal end of the tray. In another embodiment, the rail is a series of holes in each track and the carriage comprises a sprocket at each distal end of the tray.

In another aspect, the present invention features a method of loading one or more objects onto a vehicle comprising: 1) providing a stowage apparatus as described above with the detachable second portions of the track, 2) fastening the object to the tray of the carriage in the lower accessible position; 3) initiating the power drive and rotating the means for driving the carriage in a direction that moves the carriage upwards along the tracks; and 4) stopping the power drive when the carriage has reached at least a lower accessible position or an upper storage position. In another embodiment, the rail is an array of teeth, a chain, or a series of holes in each track.

BRIEF DESCRIPTION OF DRAWINGS

The present invention is further described with reference to the accompanying drawings, which show various embodiments of the present invention. However, it should be noted that the invention as disclosed in the accompanying drawings is illustrated by way of example only. The various elements and combinations of elements described below and illustrated in the drawings can be arranged and organized differently to result in embodiments which are still with the spirit and scope of the present invention.

DETAILED DESCRIPTION OF THE INVENTION

The apparatus of the present invention for storing and accessing objects can be used in any application or environment, but has a particular advantage when used on a vehicle. Accordingly, although the apparatus in the accompanying figures and described hereinafter is for a vehicular application, it should be noted that this application is presented by way of example only, and does not indicate or imply that the present invention is limited to vehicular applications. Similarly, the apparatus of the present invention is illustrated and described for use on a truck, but can instead be used on any other type of vehicle desired.

Figure 1:
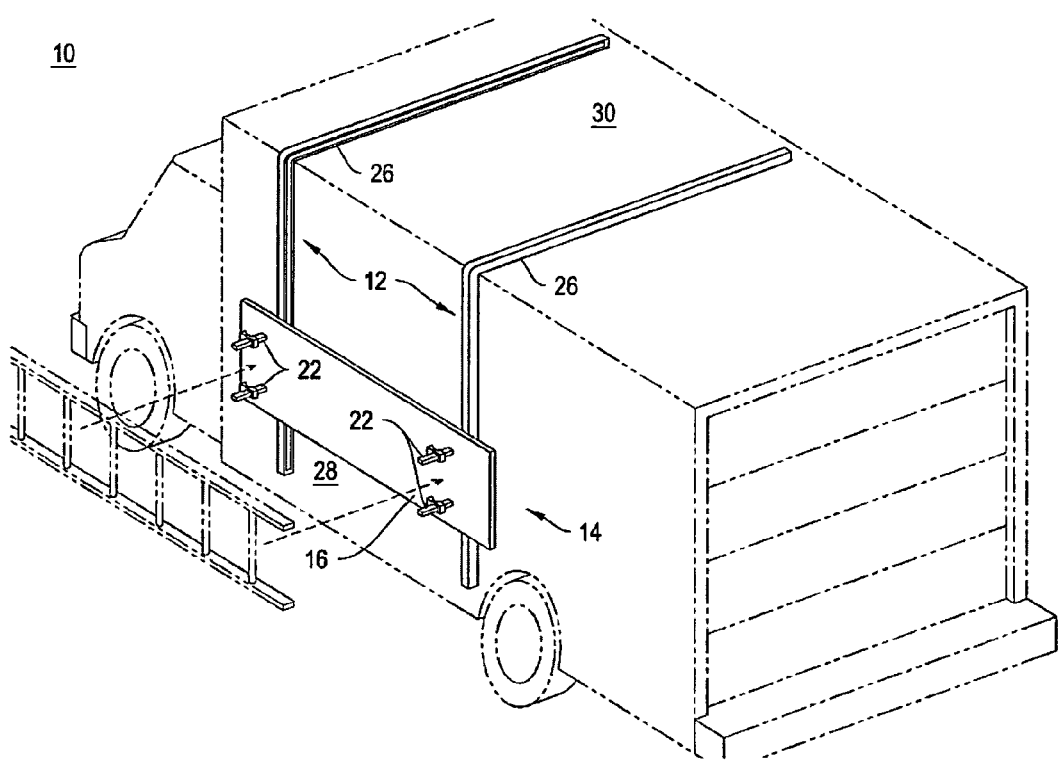
FIG. 1 is a perspective view of one embodiment of the apparatus of the present invention mounted upon a vehicle with two L shaped tracks and one carriage.

The apparatus for storing and accessing an object of the present invention (indicated generally as 10 in the figures) has mounting frame 12, and one or more carriages 14, comprising a tray 16 having two distal ends, a gear 18 at each distal end effectively interlocking with a rail 20, an object fastener 22 attached to tray 16, and a power drive 24 operatively attached to tray 16 and capable of rotating one or both gears 18. FIG. 1 shows a perspective view of one embodiment of the present invention where mounting frame 12 comprises two L-shaped tracks 26 extending over the roof of the vehicle. Tracks 26 house rails 20 and other components, as will be discussed, to guide one or more carriages 14 between the two positions: lower, accessible position 28 (shown in FIG. 1) and upper storage position 30. Tracks 26 have a shape that generally conforms to the shape of the vehicle and are mounted upon the vehicle in a conventionally manner. For example, tracks 26 may comprise a flange extending outwards that allow mounting frame 12 to be bolted to the vehicle. Although not shown in FIG. 1, supports may connect tracts 26 for additional stability and may also be fashioned as a method of attachment. Such mounting arrangements depend at least partially upon the type of vehicle used (e.g. pick-up truck, flatbed truck, stationwagon, fire truck, etc.), but all share in common one or more mounting locations for the remainder of the apparatus parts as will be described below. Frames and their manner of attachment are well known to those skilled in the art and are not therefore described further herein.

Carriage 14 is of appropriate length and width for the object(s) and transverses between tracks 26. Mounted securely to the front of carriage 14 is object fastener 22. Object fastener 22 depends on the object. Shown in FIG. 1 is an object fastener designed to store elongated objects such as a ladder. This particular object fastener is shown in greater detail in FIG. 5. Other object fasteners include clamps, Velcro straps, bungee chords, buckles, or chords for tying or otherwise securing the object. Another useful object fastener 22 is tubing such as polyvinyl chloride (PVC) tubing used often in the plumbing trade to hold elongated objects such a copper pipes. The object fastener for PVC tubing comprises a first curved frame mounted to carriage 14 and a second curved frame which clamps over the tubing to the first curved frame.

Figure 2:
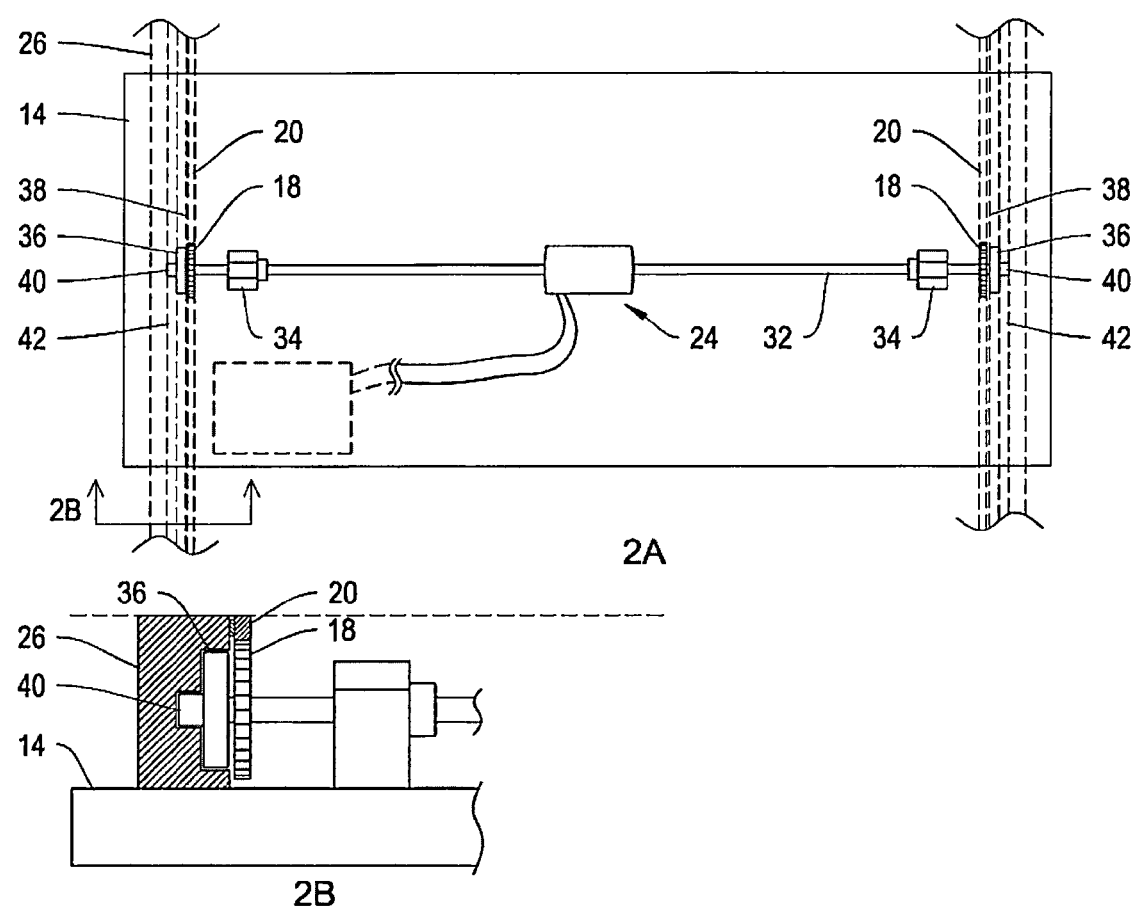
FIG. 2 is A) a perspective view from behind a carriage showing a power driven axle connected to two gears at either end which effectively interlock with the rails; and B) an enlarged view of the gear and a bushing in a track.

FIG. 2A shows a perspective view from behind carriage 14. Shown is power drive 24 which operatively connects to axle 32 and is capable of rotating axle 32 in either direction. Axle 32 extends in either direction from power drive 24 and for greater stability may be secured to carriage 14 via a pair of U-shaped clamps 34. Axle 32 is further operatively connected to gear 18 on either end such that axle 32 and gear 18 rotate in the same direction when operated. Gear 18 effectively interacts with rail 20 set in track 26 such that when rotated, carriage 14 is lifted or lowered depending on the direction of the rotation. Axle 32 further extends beyond gear 18 to bushing 36 on either side. FIG. 2B is an enlarged view of axle 32 extending through U-shaped clamp 34, gear 18, and bushing 36. Bushing 36 fits into space 38 within track 26 and helps guide carriage 14 smoothly between the two positions. A portion, 40, of axle 32 may extend beyond bushing 36 and into space 42.

In a preferred embodiment, the power drive is a motor. The motor is powerful enough to lift or lower carriage 14 smoothly and safely between lower accessible position 28 and upper storage position 30. The motor may be manually operated via a switch or may be remotely operated via a mechanism similar to a car door opener. In one embodiment, the motor turns itself off when resistance is met between the two positions similar to the way an electric car window stops upon fully closing or opening.

Figure 9:
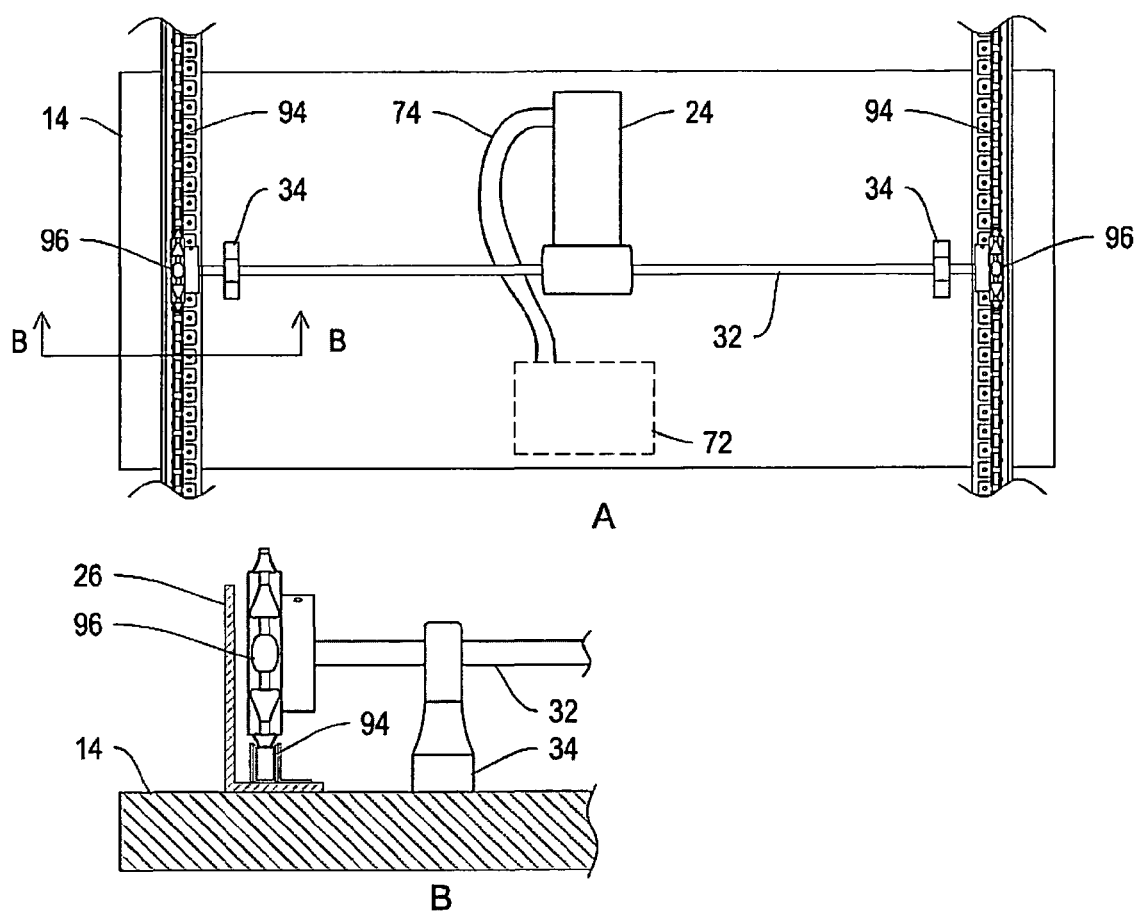
FIG. 9 is A) a perspective view from behind a single carriage showing a receiver, a power drive, and two sprockets effectively interlocking with chains housed within the two tracks; and B) an enlarged view from above the carriage showing a sprocket effectively interlocking with a chain housed within a track.
Figure 10:
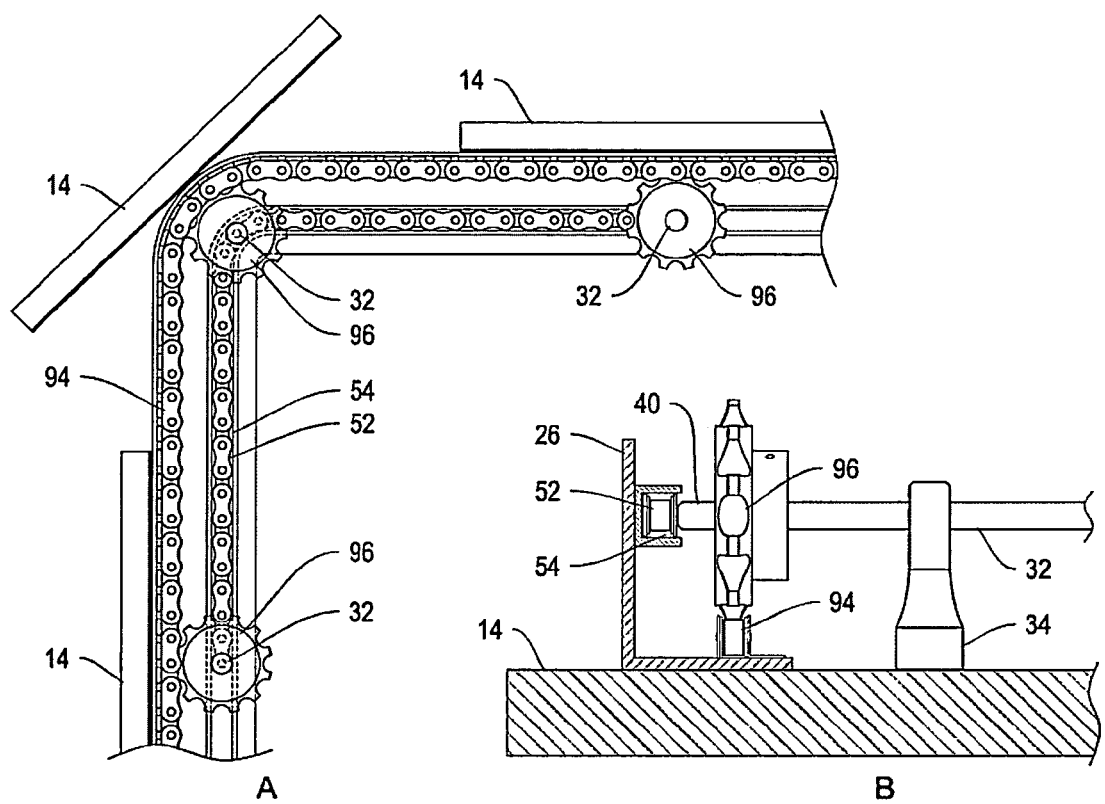
FIG. 10 is A) a perspective side view of multiple carriages comprising sprockets effectively interlocking with a chain housed within a track, wherein the carriages are connected to each other through a connecting chain; and B) a perspective looking down behind a portion of a carriage showing a sprocket effectively interlocking with a chain, and a connecting chain confined within a channel in a track.
Figure 11:
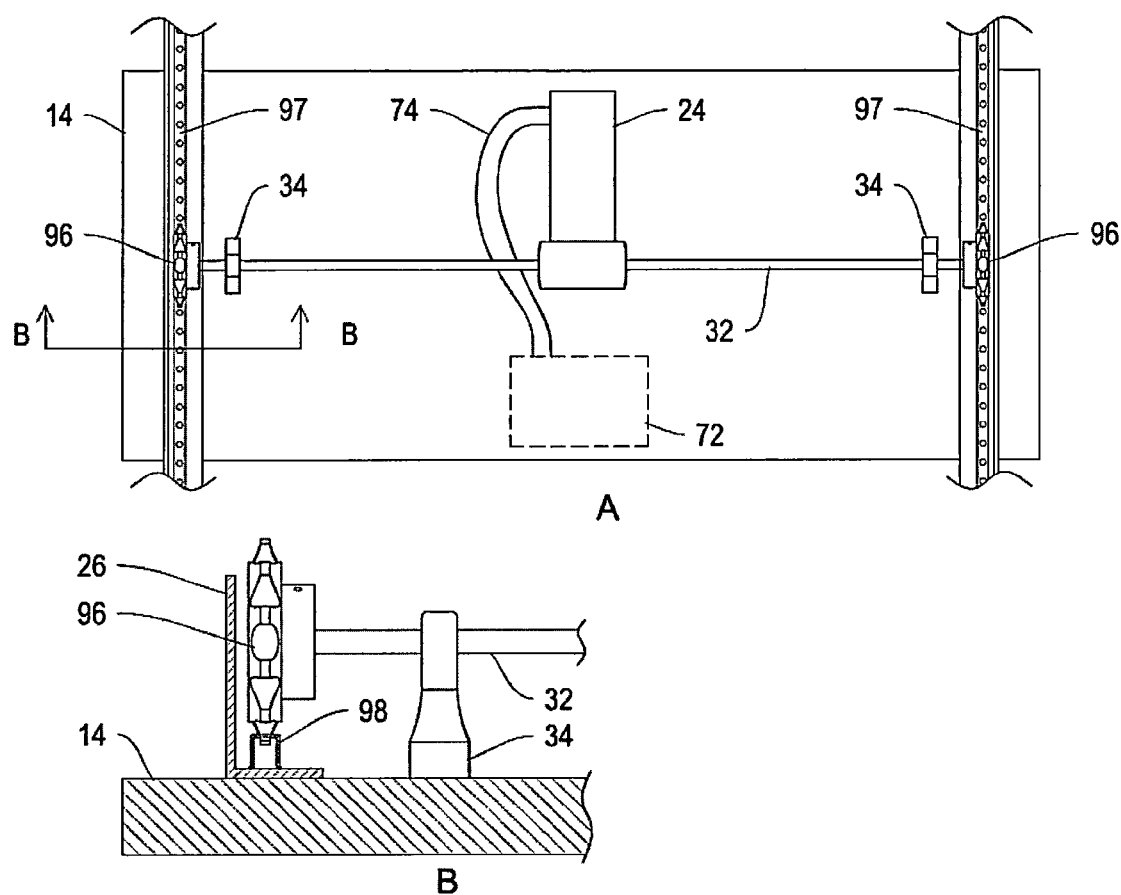
FIG. 11 is A) a perspective view from behind a single carriage showing a receiver, a power drive, and two sprockets effectively interlocking with a series of holes housed within the two tracks; and B) an enlarged view from above the carriage showing a sprocket effectively interlocking with a series of holes housed within a track.

FIGS. 2A and 2B also disclose the embodiment where rail 20 is an array of teeth capable of effectively interacting with gear 18. This embodiment is also disclosed in FIGS. 4, 6, and 7. As will be discussed later, FIGS. 8, 9, and 10 disclose the embodiment where rail 20 is a chain capable of effectively interlocking with sprocket 96, and FIG. 11 discloses the embodiment where rail 20 is a series of holes capable of effectively interlocking with sprocket 96. In general, when rail 20 is an array of teeth, carriage 14 comprises gear 18, and when rail 20 is a chain or series of holes in track 26, carriage 14 comprises sprocket 96. The term gear as used herein refers to a disk or wheel, having cut teeth of such form, size, and spacing that they mesh with teeth in another part to transmit or receive force and motion. Sprocket as used herein is similar but refers more so to a toothed wheel engaging with a chain or series of holes to transmit or receive force and motion.

Figure 3:
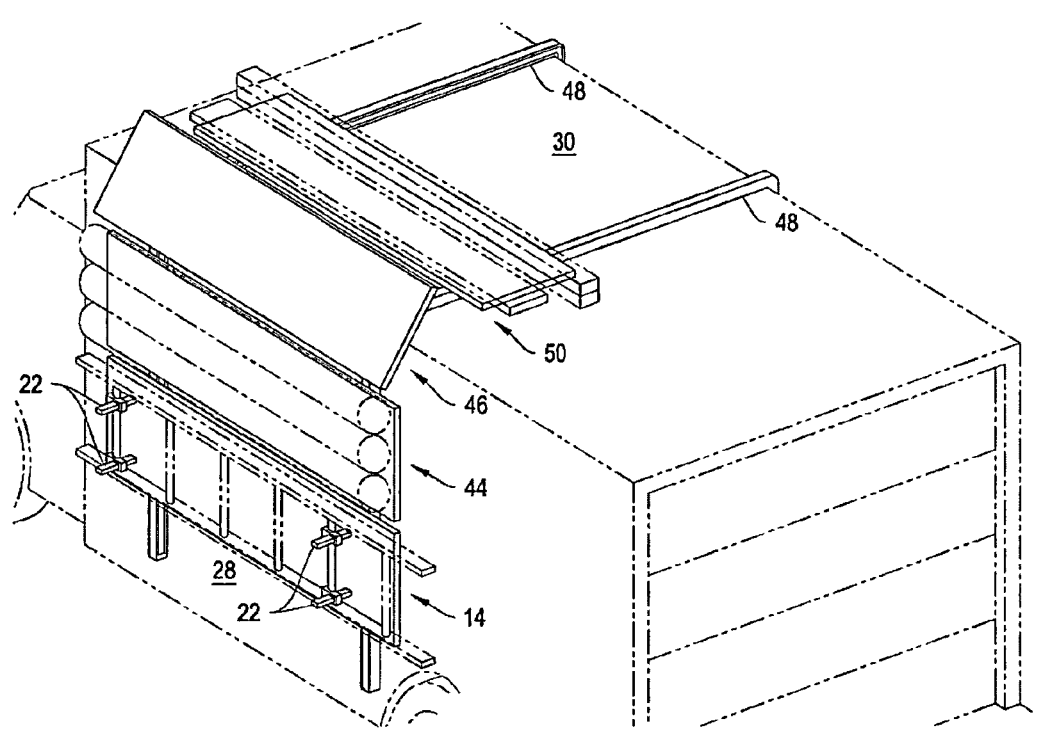
FIG. 3 is a perspective view of one embodiment of the present invention showing multiple trays for holding several different types of objects.

FIG. 3 discloses an embodiment of the invention where more than one carriage is used. It is envisioned by the inventor that in one embodiment 1, 2, 3, or 4 carriages may be used, or even 5 or 6 carriages may be used depending on the size of the trays. In FIG. 3, carriages 14 and 44 are in lower accessible position 28, carriage 46 is rounding the corner of tracks 48, and carriage 50 is in upper storage position 30. FIG. 3 discloses the versatility of the present invention as multiple carriages allow for multiple objects to be stored. Carriage 14 can be used for example to store a ladder, carriage 44 can be used for example to store copper piping within PVC tubes, and carriage 50 can be used for example to store wooden beams and planks. FIG. 3 also discloses an embodiment of the present invention where tracks 48 are U-shaped as opposed to tracks 26 in FIG. 1 which are L-shaped. U-shaped tracks 48 are useful, for example, for vehicles on construction sites which may be parked in either direction.

FIG. 4A discloses a perspective from behind the carriages where there is more than one carriage. The two end carriages comprise power drive 24. Each tray comprises axle 32, and gears 18 on either end of axle 32. U-clamps 34 are used on either side of power drive 24 to secure axle 32 to the trays. In this embodiment, bushing 36 is confined to space 38 in. FIG. 2B. Chain 52 is made up of links 56 held together by connectors 58 which allow axle 32 to extend into link 56 or beyond. Chain 52 need only be long enough to link the carriages together via each carriage's axle 32. It is the confinement of chain 52 within space 54 that assists the movement of the carriages in unison around the corner of tracks 26 or 34. FIG. 4B is a side view from the perspective of the interior of the carriage and down the center of axle 32. Axle 32 first proceed through U-shaped clamp 34 (dotted line in FIG. 4B so as not to obscure), through gear 18, and into link 56 of chain 52 (hidden by gear 18).

Figure 5:
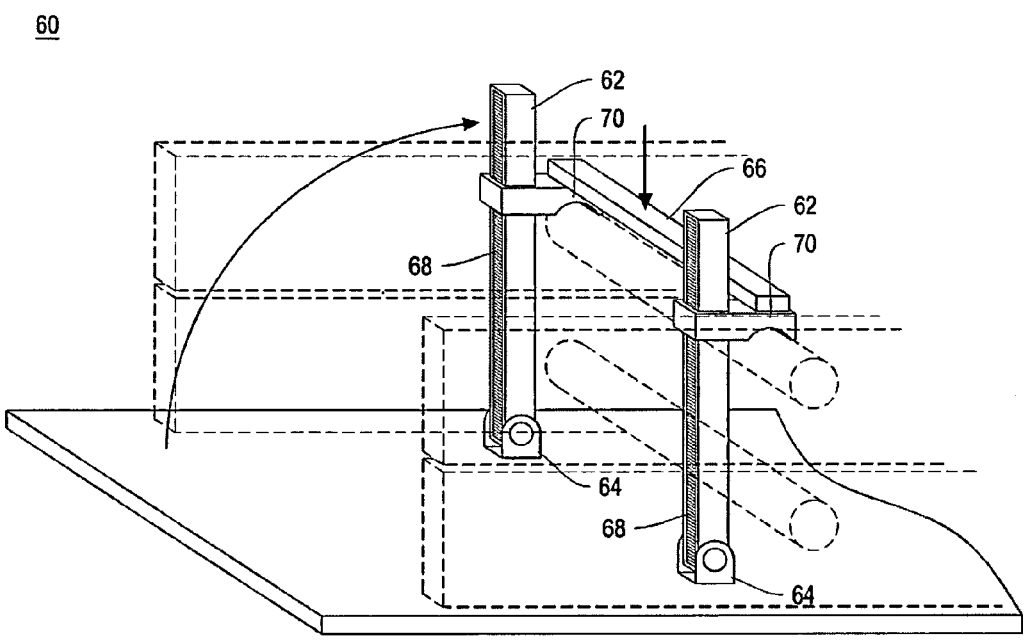
FIG. 5 is a perspective view of one example of an object fastener useful for fastening elongated objects.

FIG. 5 is a more detailed drawing of one embodiment of object fastener 22. In this embodiment, object fastener 60 is particularly suitable for a ladder. Extendable arms 62 are pivotally attached to carriage 14 through fasteners 64 which allow them to pivot between a non-use position flat against carriage 14 and the useful position shown. FIG. 5 is a half view of object fastener 60, i.e. there is another pair of extendable arms 62 and adjustable clamp 66 at the other distal end of carriage 14. In general, extendable arms 62 comprise an array of ridges 68 capable of interlocking with adjustable clamp 66. Adjustable clamp 66 comprises curved piece 70 for effectively holding a ladder in place via the rungs. Curved piece 70 comprises a releasable catch for interlocking with array of ridges 68.

Figure 6:
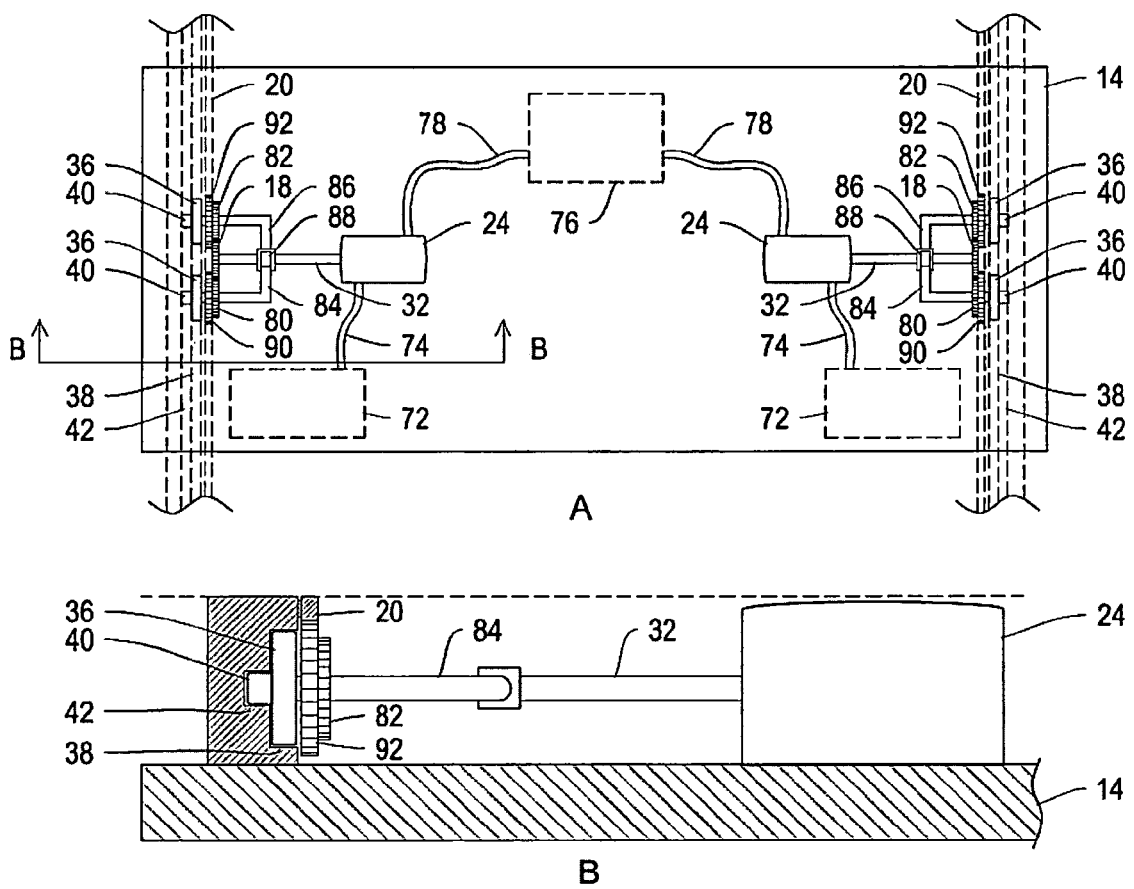
FIG. 6 is A) a perspective view from behind a single carriage showing a receiver connected to two power drives which are in turn connected to two power sources; and the three interlocking gear system; and B) an enlarged view from above the L-shaped axel extending through an outer and engaging gear and a bushing.

FIG. 6 depicts another working embodiment of the present invention. In this embodiment, behind carriage 14, mounted power drives 24 are powered by mounted power sources 72. Power sources 72 can be batteries such as, for example, 12 volt batteries. Electrical wires 74 connect power sources 72 to power drives 24. Also depicted is receiver 76 which receives transmitted signals and routes them to power drives 24 through electrical wires 78. It is envisioned by the inventor that power drives 24 would be turned on and off via receiver 76.

Also depicted in FIG. 6 is the three interlocking gear system. Axels 32 extend from power drives 24 to gears 18. Gears 18 effectively interlock with outer gears 80 and 82. Outer gears 80 and 82 are attached to engaging gears 90 and 92, which interlock with rails 20. When power drives 24 turn axles 32 and, in turn, gears 18, outer gears 80 and 82 and engaging gears 90 and 92 all turn in the same direction to move carriage 14 along tracks 26 (see FIG. 1) or 48 (see FIG. 3) between lower, accessible position 28 and upper, storage position 30 (see FIG. 1). L-shaped axle 84 extends from outer gears 80 to axel 32. L-shaped axle 86 extends from outer gears 82 to axel 32. L-shaped axels 84 and 86 are pivotally attached to axel 32 such that each axel can rotate, changing the angle between axels 84, 32, and 86. L-shaped axels 84 and 86 can attach to axel 32 next to each other like two hands of a clock, or in a preferred embodiment, one of the L-shaped axels is C-shaped with the other L-shaped axel fitting into the C, as depicted in arrangement 88 in FIG. 6. The greater flexibility provided by the three interlocking gear system assists moving heavier loads around the corner of tracks 26 or 48. Both L-shaped axels 84 and 86 extend beyond engaging gears 90 and 92 to bushings 36 for greater stability. Portion 40 of L-shaped axels 84 and 86 extends into space 42.

FIG. 6B depicts a portion of a perspective looking downward behind carriage 14. Shown is power drive 24 operatively attached to axel 32. From this upper perspective, only L-shaped axel 86 is visible, extending through outer gear 82, engaging gear 92, and bushing 36. Engaging gear 92 engages with rail 20. Bushing 36 rests in space 38, and portion 40 of L-shaped axel 86 rests in space 42.

Figure 4:
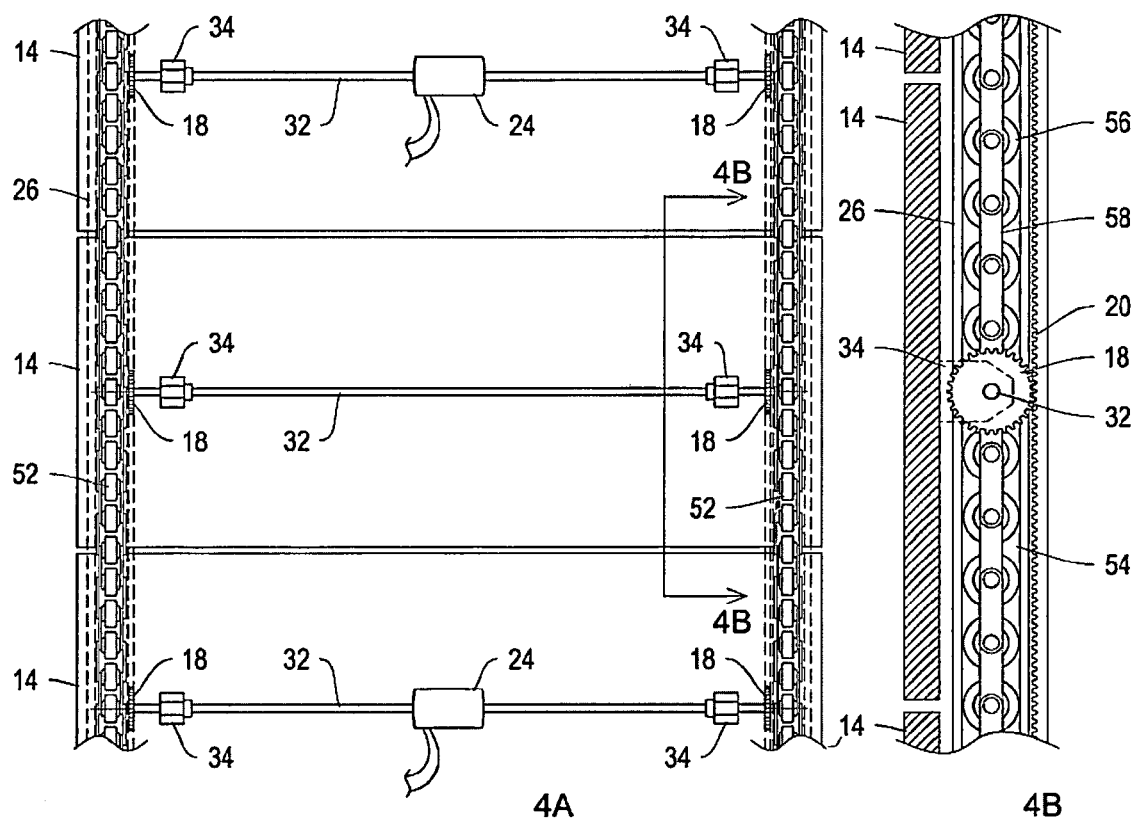
FIG. 4 is A) a perspective view from behind multiple carriages showing several power driven axles, with gears at either end, that further interlock with a connecting chain that's confined within a track and links the carriages together; and B) an enlarged side view of the chain confined within a channel within a track.
Figure 7:
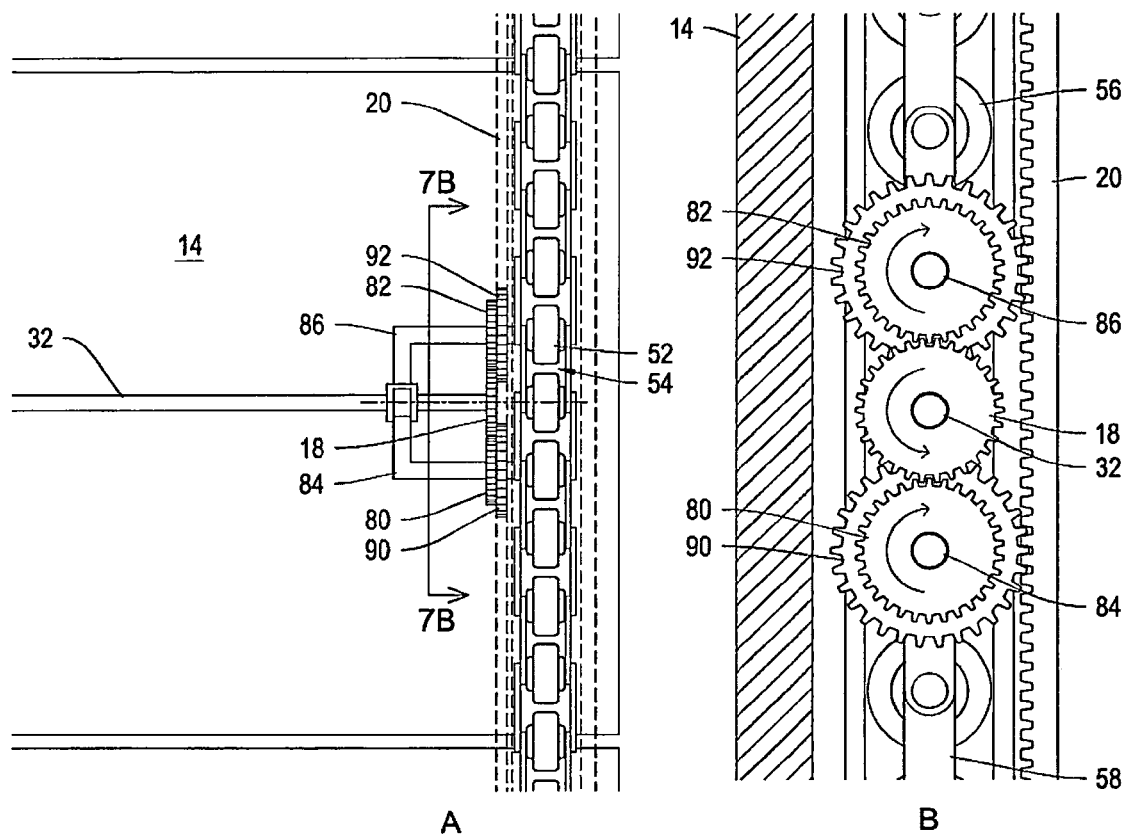
FIG. 7 is A) a perspective view from behind a single carriage showing the three interlocking gear system with a chain; and B) an enlarged side view showing how the gears of the three interlocking gear system work together to move a carriage between its two positions.

FIG. 7 depicts an embodiment of the present invention combining the three interlocking gear system of FIG. 6 with the chain embodiment of FIG. 4. FIG. 7A shows a portion from behind carriage 14 where axel 32 extends to gear 18. Gear 18 effectively interlocks with outer gears 80 and 82, which interlock with engaging gears 90 and 92. Engaging gears 90 and 92 effectively interlock with rail 20. L-shaped axels 84 and 86 extend from axel 32, to which they are pivotally attached, through outer gears 80 and 82 and engaging gears 90 and 92, respectively. L-shaped axels 84 and 86 further extend into chain 52 which is confined to space 54. As in FIG. 4, chain 52 replaces bushing 36 and helps multiple carriages move in unison.

FIG. 7B depicts the side view indicated in FIG. 7A. Portions of L-shaped axels 84 and 86 have been left out so as not to obscure how gear 18 interlocks with outer gears 80 and 82. In FIG. 7B, one can see that gear 18 does not interlock with rail 20, which would prevent any movement of carriage 14. Gear 18 only interlocks with outer gears 80 and 82, which in turn are operatively attached to engaging gears 90 and 92. One can also see how engaging gears 90 and 92 always move in the same direction. For example, and as depicted in FIG. 7B, when gear 18 turns counter clockwise, outer gears 84 and 86, and engaging gears 90 and 92 turn in a clockwise direction, moving carriage 14 upward from lower accessible position 28 to upper, storage position 30 (see FIG. 1). Likewise, turning gear 18 in a clockwise direction turns outer gears 84 and 86, and engaging gears 90 and 92 in a counter clockwise direction, lowering carriage 14 from upper, storage position 30 to lower, accessible position 28. L-shaped axels 84 and 86 extend beyond engaging gears 90 and 92 into chain links 56 which are held together by connectors 58 to from chain 52.

As carriage 14 rounds the corner of either L-shaped tracks 26 or U-shaped tracks 48, the angle between gears 18 and outer gears 80 and 82 will be less than the 180 degrees depicted in FIG. 7B. Importantly, because of the pivotal attachment between L-shaped axels 84 and 86 and axel 32, gear 18 will always be effectively interlocking with outer gears 80 and 82. The three interlocking gear system as described herein also offers a wide range of flexibility to one of ordinary skill in the art through adjustment of gears sizes between gear 18, outer gears 80 and 82, and engaging gears 90 and 92. One of ordinary skill in the art will appreciate that adjusting the size of these gears relative to each other adjust speed and leverage, and can thus be designed as needed for a particular utility.

Figure 8:
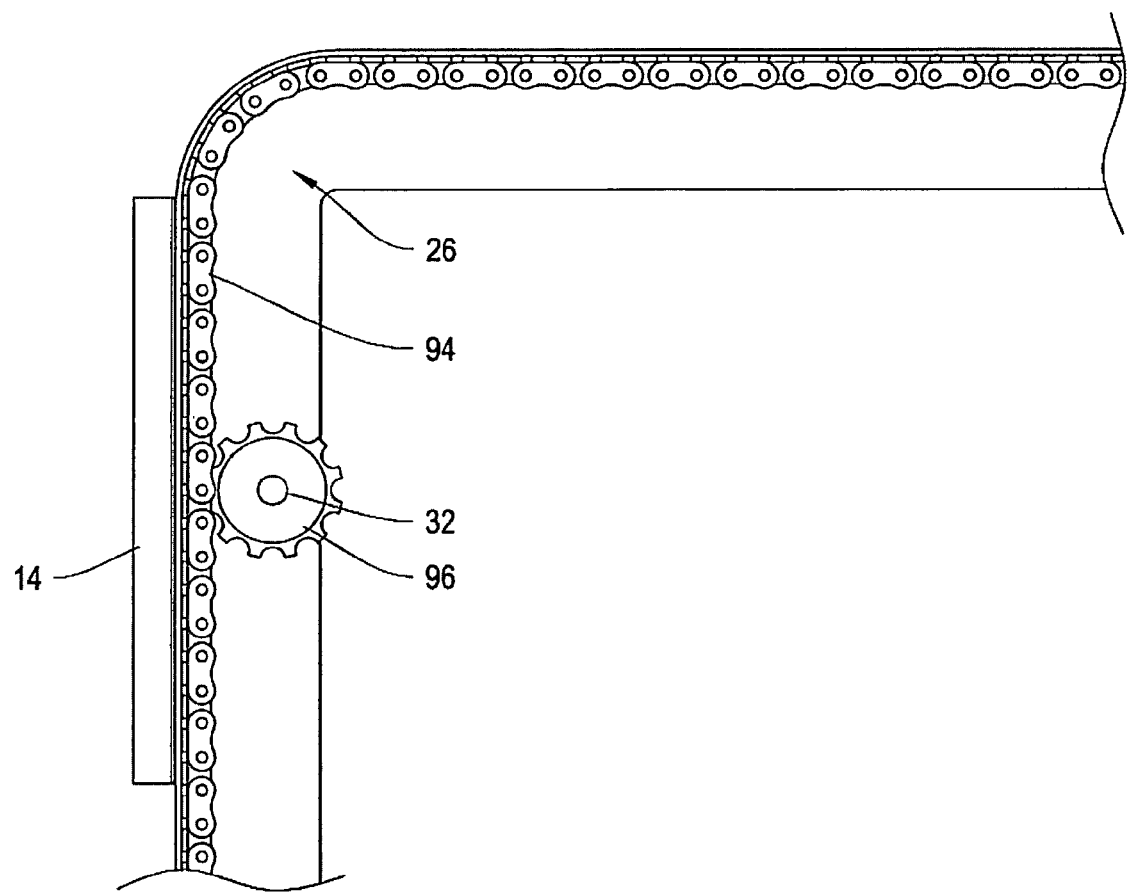
FIG. 8 is a perspective view of one embodiment of the present invention where the carriage comprises a tray and a sprocket which interlocks with a chain housed within a track.

FIG. 8 shows a side perspective of another embodiment of the present invention where carriage 14 is in lower accessible position 28. Track 26 comprises chain 94 as rail 20, as opposed to the array of teeth seen previously. Instead of gear 18, sprocket 96 attached to axel 32 effectively interlocks with chain 94 to move carriage 14 between lower accessible and upper storage positions 28 and 30, respectively. Chain 94 is fastened to track 26 by ordinary means, including, but not limited to, welding for example.

FIG. 9A shows a view from behind carriage 14 of this embodiment. Power source 72 connects to power drive 24 through electrical wires 74 to drive axel 32 which extends through U-shaped clamps 34 to sprockets 96, which effectively interlock with chain 94. When powered, sprockets 96 turn in either direction to move carriage 14 up or down. FIG. 9B shows a blown up view looking down chain 94. Sprocket 96 effectively interlocks with chain 94. When axel 32 rotates in either direction the effect is to move carriage 14 between lower accessible position 28 and upper storage position 30.

FIG. 10A shows this embodiment with multiple carriages 14. Track 26 comprises chain 94 which effectively interlocks with sprockets 96. Track 26 also comprises chain 52, confined in space 54, which connects carriages 14. Axels 32 extend beyond sprockets 96 into the links of chain 52. As in the embodiment depicted in FIG. 4, chain 52 helps carriages 14 move in unison. Only one carriage 14 need have power drive 24. FIG. 10B shows a blown up view looking down chain 94. Axel 32 extends through U-shaped clamp 34 into sprocket 96. Sprocket 96 effectively interlocks with chain 94, which is securely held in place in track 26. Portion 40 of axel 32 extends past sprocket 96 into chain 52 which is confined to space 54.

FIG. 11A shows a view from behind carriage 14 of the embodiment when rail 20 is a series of holes 97. Power source 72 connects to power drive 24 through electrical wires 74 to drive axel 32 which extends through U-shaped clamps 34 to sprockets 96, which effectively interlock with series of holes 97. When powered, sprockets 96 turn in either direction to move carriage 14 up or down. FIG. 11B shows a blown up view looking down series of holes 96. Sprocket 96 effectively interlocks with series of holes 97. In one embodiment, the series of holes 97 is made in c-column 98, which is held in place by ordinary means, including, but not limited to, welding to track 26. When axel 32 rotates in either direction the effect will be to move carriage 14 between positions lower accessible position 28 and upper storage position 30.

Figure 12:
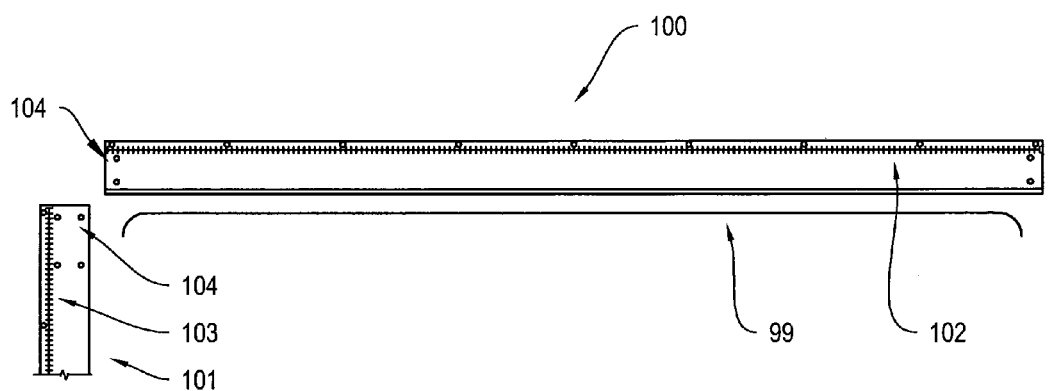
FIG. 12 is perspective side view of one embodiment of the present invention where the L-shaped track is in several detachable pieces.

FIG. 12 shows an embodiment in which L-shaped track 26 is not in one piece but comprises upper first portion 100 and lower second portion 101. In this embodiment upper first portion 100 is mounted on the top surface of the vehicle 99 while lower second portion 101 does not mount to the side of the vehicle. This allows lower second portion 101 to be detachable. Note that track 26 still comprises a rail, which in FIG. 12 is chain 102 in the upper first portion, and chain 103 in the lower second portion. Not pictured in FIG. 12 is the corner portion which attaches upper first portion 100 and lower second portion 101 through holes 104 present in both portions. This corner piece is depicted in FIG. 13.

Figure 13:
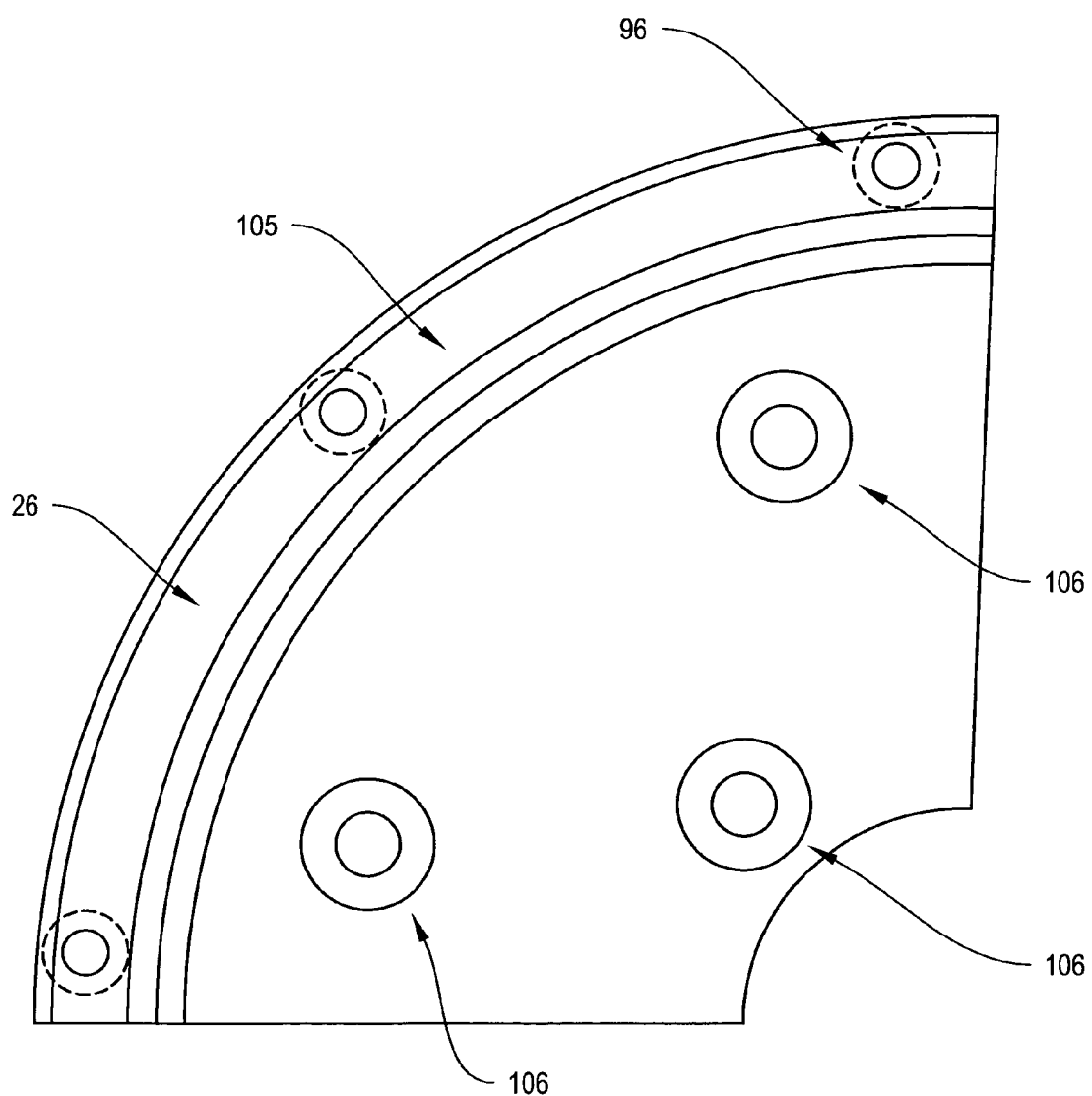
FIG. 13 is a perspective side view of the corner of the detachable track.

FIG. 13 depicts corner portion 105 which connects upper first portion 100 and lower second portion 101 from FIG. 12. It accomplishes this through holes 106 and a flange depicted in FIG. 14. Corner piece 105 comprises track 26 and sprocket 96 depicted travelling through 3 separate positions. Sprocket 96 interacts with a rail that may either be a chain or series of holes (not pictured). In this embodiment, the lower second portion is not mounted to the side surface of the vehicle but hangs from the top of the vehicle.

Figure 14:
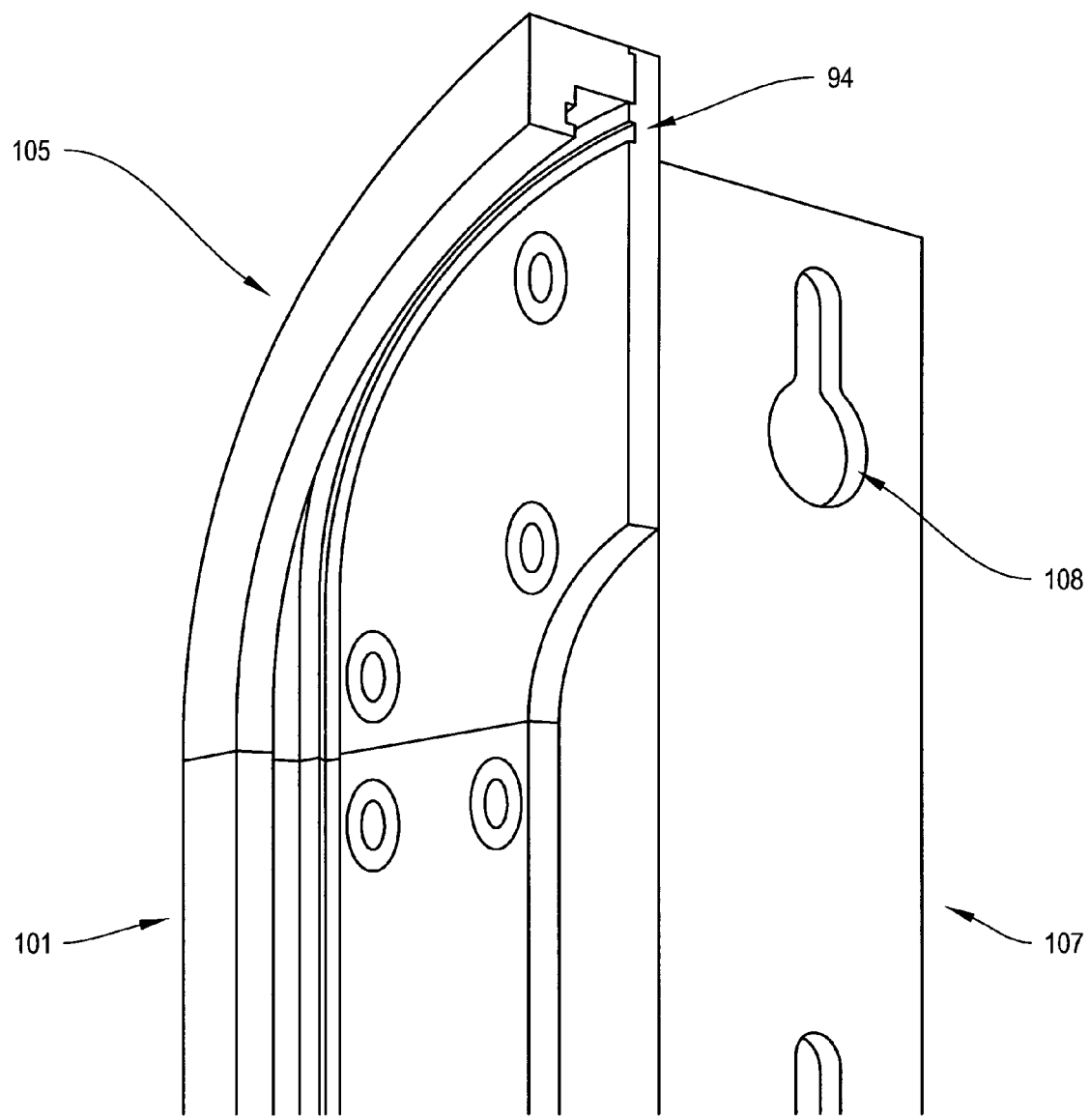
FIG. 14 is an actual picture of the corner and lower second portion of the detachable track.

FIG. 14 is an actual picture of corner piece 105 attached to lower second portion 101 detached from upper first portion 100. One can see that corner piece 105 is attached to lower second portion 101 through flange 107 via bolts in holes 104 and 106 from FIGS. 12 and 13, respectively. One can also see how attached corner piece 105 and lower second portion 101 may be re-attached to upper first portion 100 through hole 108. Also note the presence of chain 94 which exists separately in upper first portion 100, corner piece 105, and lower second portion 101, but when assembled provides a continuous chain for sprocket 96 to interact with.

While particular embodiments of this invention have been shown in the drawings and described above, it will be apparent that many changes may be made in the form, arrangement and positioning of the various elements of the combination. In consideration thereof it should be understood that preferred embodiment of this invention disclosed herein are intended to be illustrative only and not intended to limit the scope of the invention.

I claim:

1. A utility stowage apparatus for transferring one or more objects between an upper storage position and a lower accessible position of a vehicle comprising:
   a stationary mounting frame comprising two L-shaped or U-shaped tracks, wherein the tracks comprise respectively first and second portions connected through a corner portion, each of the first portions and second portions lying in parallel, wherein the first portions of the tracks are mounted to the top surface of the vehicle and wherein the second portions of the tracks and corner portions are attached through a flange and bolts, are not mounted to the vehicle, and are detachable from the first portions of the tracks through the flange and at least one hole,
   each of the first and second portions of the at least two tracks comprises at least a channel and at least a rail,
   at least one carriage movably mounted on the rails and comprising:
   a) a tray having two distal ends,
   b) an axel connected to the tray and having first and second distal ends located proximate the distal ends of the tray,
   c) means for driving the carriage along the tracks, wherein the means further comprises at least a first means mounted on the first distal end of the axel and at least a second means mounted on the second distal end of the axel, wherein the first and second means respectively comprise a gear or a sprocket for effectively interlocking with the rails of the track wherein the means for driving are engagingly interlocked with the rail,
   d) at least a first bushing mounted on the first distal end of the axel and at least another bushing mounted on the second distal end of the axel, wherein the bushings guidingly engage the channels of the track,
   e) a power drive operatively connected to the axel and for rotating at least one of the first or second means, and
   f) an object fastener attached to the tray for supporting and retaining an object on the tray,
   wherein operation of the power drive rotates at least one of the first or second means for driving the carriage along the tracks between the lower accessible position and the upper storage position.

2. The apparatus of claim 1, wherein the rail comprises an array of teeth, a chain, or a series of holes in the track.

3. The apparatus of claim 1, wherein the object fastener fastens skis, a surfboard, a bicycle, or a kayak.

4. The apparatus of claim 1, further comprising 1, 2, or 3 additional carriages each comprising a tray having two distal ends, a gear or sprocket at each distal end effectively interlocking with the rail, and an object fastener attached to the tray.

5. The apparatus of claim 4, wherein the carriages are connected to each other by a chain.

6. The apparatus of claim 1, wherein the power drive is a motor.

7. The apparatus of claim 1, wherein the object fastener comprises a clamp, Velcro strap, bungee chord, buckle, or chord.

8. The apparatus of claim 1, wherein the object fastener comprises at least two posts and a clamping device which operatively and reversibly clamps onto one or more posts after the object has been placed on the posts.

9. The apparatus of claim 8, wherein the object fastener comprises four posts and a clamping device which operatively and reversibly clamps onto one or more posts after the object has been placed on the posts.

10. The apparatus of claim 1, wherein the object fastener comprises tubing mounted to the tray and having removable caps at either end on the tubing.

11. The apparatus of claim 10, wherein the tubing is polyvinyl chloride tubing.

12. The apparatus of claim 1, wherein the rail is an array of teeth and the carriage comprises a gear at each distal end of the tray.

13. The apparatus of claim 1, wherein the rail is a chain and the carriage comprises a sprocket at each distal end of the tray.

14. The apparatus of claim 1, wherein the rail is a series of holes in each track and the carriage comprises a sprocket at each distal end of the tray.

15. A method of loading one or more objects onto a vehicle comprising:
   1) providing a stowage apparatus as claimed in claim 1,
   2) fastening the object to the tray of the carriage in the lower accessible position;
   3) initiating the power drive and rotating the means for driving the carriage in a direction that moves the carriage upwards along the tracks; and 4) stopping the power drive when the carriage has reached at least a lower accessible position or an upper storage position.

16. The method of claim 15, wherein the rail is an array of teeth, a chain, or a series of holes in each track.

\* \* \* \* \*